United States Patent
Lundborg

(10) Patent No.: US 10,574,774 B2
(45) Date of Patent: Feb. 25, 2020

(54) DISTRIBUTED CACHING

(71) Applicant: Telefonaktiebolaget L M Ericsson (publ), Stockholm (SE)

(72) Inventor: Tomas Lundborg, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 839 days.

(21) Appl. No.: 14/649,237

(22) PCT Filed: Dec. 27, 2012

(86) PCT No.: PCT/SE2012/051500
§ 371 (c)(1),
(2) Date: Jun. 3, 2015

(87) PCT Pub. No.: WO2014/104953
PCT Pub. Date: Jul. 3, 2014

(65) Prior Publication Data
US 2015/0304444 A1 Oct. 22, 2015

(51) Int. Cl.
| | |
|---|---|
| *H04L 29/06* | (2006.01) |
| *H04L 29/08* | (2006.01) |
| *G06F 16/28* | (2019.01) |
| *G06F 16/22* | (2019.01) |
| *H04W 4/18* | (2009.01) |

(52) U.S. Cl.
CPC ...... *H04L 67/2842* (2013.01); *G06F 16/2272* (2019.01); *G06F 16/284* (2019.01); *H04W 4/18* (2013.01)

(58) Field of Classification Search
CPC .................................................. H04L 67/2842
USPC ........................................................ 709/213
See application file for complete search history.

(56) References Cited

U.S. PATENT DOCUMENTS

| | | | |
|---|---|---|---|
| 7,849,163 B1 | 12/2010 | Issa | |
| 2003/0033282 A1 | 2/2003 | Evans et al. | |
| 2003/0191921 A1 | 10/2003 | Hauck et al. | |
| 2010/0318632 A1 | 12/2010 | Yoo et al. | |
| 2013/0336320 A1* | 12/2013 | Rangaraman | H04L 45/38 370/392 |
| 2014/0201154 A1* | 7/2014 | Varadharajan | G06F 11/1451 707/647 |

FOREIGN PATENT DOCUMENTS

EP 2916616 A2 9/2015

\* cited by examiner

*Primary Examiner* — Adnan M Mirza
(74) *Attorney, Agent, or Firm* — Coats & Bennett, PLLC

(57) ABSTRACT

There is provided a method of providing cached content in a telecommunications network. The method comprises requesting content from a caching system (S12.1). At a local cache (305), fragments are associated with the requested content (S12.5) and sent towards a user (S12.6). An identifier for the user and any of an identifier for the requested content and an index of each identified fragment is sent towards a mirror cache upstream of the local cache (S12.7). Prior to the local cache (305) identifying the fragments associated with the requested content, the mirror cache may identify fragments associated with the requested content (S12.3), and send a key comprising the index of each fragment to the local cache (305) (S12.4). The fragments will then be identified at the local cache (305) (S12.5) using the key.

38 Claims, 10 Drawing Sheets

DISTRIBUTED CACHING

TECHNICAL FIELD

The invention relates to a method of caching in a telecommunications network, and apparatus for use with the method.

BACKGROUND

Typical file caching methods include a cache receiving a file from a file server, and storing the entire file. Later when a client desires the file, instead of serving the file from the file server, the file is served from the cache. Because the cache is typically a server that is closer to the client, or has higher bandwidth than the file server, the file is served to the client quickly from the cache.

This can be understood with reference to FIG. 1, which is a schematic illustration of an exemplary architecture of a network 10 having an origin server 11 and a number of caches 12-16. Clients 17-19 are configured to receive files and/or streaming data from the origin server 11 or the caches 12-16.

In order to reduce the load on the origin server 11 and to save bandwidth in the delivery network 10, some of the content is stored in caches 12-16 closer to the end users 17-19. It is desirable to push these caches as close to the end user as possible.

For example, as shown in FIG. 2, mobile network architectures generally comprise a Core Network (CN) 200, to which are attached a number of radio access networks (RANs) in which terminals 231 to 238 are connected to radio base stations (RBSs) 221 to 224. The terminals may move and as they move they may be connected wirelessly to different RBSs. The transmission links between the RBSs and the rest of the network are usually rented and limited in capacity. One way of reducing the demands on these links is to use caching and, as described above, caching should preferably take place as close to the terminals as possible to minimize the need for transmission. For example, there may be caches 218, 219 at the radio network controllers (RNCs) 211, 212, caches 227 to 229 at the RBSs, and/or caches 209 in the core network 200. These may be controlled by a cache manager 202 in the core network 200, which organises the content stored in each of the caches to minimise the load on the network. It will be appreciated that this example is specific to a typical WCDMA RAN but it is illustrative of the situation in other systems as well.

One problem of caching in the RAN (with the cache being part of or co-located with the RBS, RNC, UE or any other RAN node) is that servers more distant from the client than the cache node are unaware of the data transfer that has occurred. This means that data monitoring nodes 203 in the core network, such as a service aware charge and control (SACC) or lawful intercept (LI) node, cannot monitor the content transmitted to the client.

One possible solution to this is to have only a single, centralised cache 209 connected to a monitoring node 203, which records the content transmitted to each client. However, this gives up the advantages of having a distributed cache in nodes closer to the client.

Another option is to distribute the monitoring functions between all cache nodes, however this would require a large scale redesign of all monitoring functions. It would also require interfacing with an arbitrary number of proprietary caching solutions, making the design of such functions more complex, expensive and difficult to maintain. Alternatively, all data requested from a cache node could be mirrored to the central monitoring node 203; however this would increase the transmission load on the network significantly. The cache could report details of the file, such as the size, filename, and type, to the monitoring node 203, or a mirror cache closer to the monitoring node 203 which can then transmit a copy of the file to the monitoring node 203. However, for lawful intercept purposes, it may not be possible to prove beyond reasonable doubt that the file served to the client was the same as that stored in the mirror cache due to the possibility of a mismatch between the local cache and the mirror cache.

Methods that can allow reliable centralised content access monitoring while still preserving the advantages of a distributed cache are thus of importance.

SUMMARY

According to an aspect of the present invention, there is provided a method of providing cached content in a telecommunications network. The method comprises requesting content from a caching system (406) (S12.1). The method further comprises, at a local cache (305), identifying fragments associated with the requested content (S12.5), sending the identified fragments towards a user (409) (S12.6), and sending an identifier for the user and any of an identifier for the requested content and an index of each identified fragment towards a mirror cache upstream of the local cache (410) (S12.7).

The mirror cache may communicate with or be integrated in a monitoring node (304), and the method may comprise, at the monitoring node, recording that the client has consumed the requested content and/or the identified fragments. The monitoring node may record the index of each identified fragment.

The local cache (305) may send the index for each fragment towards the mirror cache (305) in response to the fragment being sent towards the user (511, 512, 513). Alternatively, the local cache my send the index for all fragments sent towards the user when the user finishes accessing fragments (603).

The index for each fragment may be a pointer to the location of that fragment in a data storage unit of the mirror cache (303) and/or local cache (305).

Prior to the local cache (305) identifying the fragments associated with the requested content, the mirror cache may identify fragments associated with the requested content (S12.3), and send a key comprising the index of each fragment to the local cache (408) (S12.4). The fragments will then be identified at the local cache (305) (S12.5) using the key.

The key may comprise a checksum for each fragment (701). In this case, prior to sending the fragments towards the user, the local cache may detect a mismatch between the checksum in the key for the or each fragment and the checksum of the fragment associated with the index in the local cache, and sending a request to the mirror cache identifying an index for which the mismatch occurred (702). The mirror cache may then send the fragment in the mirror cache associated with the index for which the mismatch occurred to the local cache (703). The local cache (305) then receives the update fragment from the mirror cache, and replaces the fragment associated with the index in the local cache for which the mismatch occurred with the update fragment (704).

Each fragment may be encrypted, and the key may comprise a secret, with the local cache (305) decrypting the fragments using the secret.

The mirror cache may not send the key towards the local cache until it has received authorisation from the monitoring node.

The local cache (305) may be located at a client device (306), and sending the identified fragments towards the user may include sending the identified fragments towards a user interface assembly of the client device (306).

The local cache may be located upstream of a client device (306), and sending the identified fragments towards the user may include sending the identified fragments towards the client device (306).

The client device (306) may request content from the caching system by sending a HTTP GET request.

The content may be video content and each of the fragments may be a frame of the video content. The monitoring node may determine a portion of the video content corresponding to the fragments sent towards the user.

According to a further aspect of the present invention, there is provided a method of storing content in a cache in a network. The method comprises, in a mirror cache (303), receiving, from a fragmenter (302), content split into fragments (S13.3), storing the fragments (S13.4), associating each fragment with an index (S13.5), and associating the indices with the content (405) (S13.6).

The mirror cache may identify a first fragment of the content which is identical to a second fragment stored in the mirror cache, and in response, delete the first fragment and the index associated with the first fragment and associate an index associated with the second fragment with the content.

The index for each fragment may comprise a pointer to the location of that fragment in data storage (901) of the mirror cache (303).

The mirror cache may send the fragments and indices towards a local cache.

The mirror cache (303) may also act as the fragmenter (302).

There are further provided apparatuses configured to operate as a local cache, mirror cache, and monitoring node in the above methods, and computer programs which cause an apparatus to behave as one of the provided apparatuses.

DRAWINGS

DETAILED DESCRIPTION

As discussed above, it is desirable to find a method of caching data which allows reliable monitoring functions, without needing to distribute those functions throughout the network.

Figure 11:
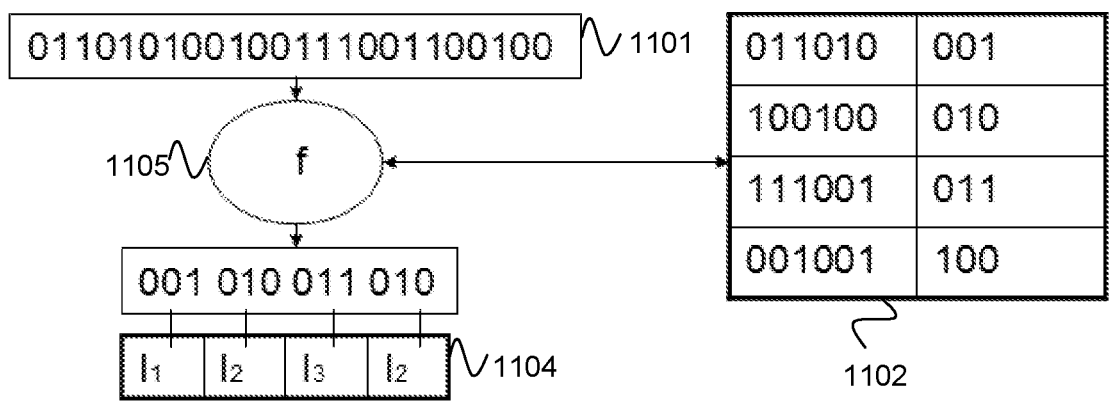
FIG. 11 is an illustration of an example file indexing method.

To achieve this, the data is stored both in the local cache(s), and in a central "mirror" cache. The data stored is split into fragments, preferably on a sub-file level. The local cache may be unaware which fragments correspond to which files so, on receiving a request for content, it forwards this request to the mirror cache. The mirror cache then responds with an index identifying the fragments which form the requested file, and either the mirror or local cache notifies the monitoring node of the file request. For example, as shown in FIG. 11, it can be seen that if a client requests a file x.bin containing the data 01101010010011001100100, 1101, the mirror cache needs to send the key sequence $I_1$ $I_2$ $I_3$ $I_2$ 1104 to the local cache before the file can be sent to the client. The key is determined with reference to an index table 1102. The index table is created by inputting the content into a fragmenting function 1105. The fragmentation is explained in more detail below. The key will only work if both the local cache and the mirror cache contain the same content. This ensures that all content downloaded to the client is identical to that recorded by the monitoring node.

This could be used with existing monitoring nodes, as the mirror cache could send a copy of the downloaded files to the monitoring node. Alternatively, the monitoring service could be modified to receive a summary of the download, or the content request or key transmission. In this case, a SACC or LI node may request content from the mirror cache using the content request or key in order to recover the content transmitted to the client. This will require a log of changes to the cache to be kept, and a timestamp added to the key stored at the SACC or LI, so that previously stored content can be recovered.

There is a trade off in determining the size of the fragments. Smaller fragments allow better compression of the caches, as there is a greater chance that different files will use the same fragment. However, using smaller fragments also requires more data to be sent between the mirror and local caches, as the size of the key is dependent on the number of fragments that makes up the file.

The local cache could notify the monitoring service of the delivery of each fragment. This would allow the monitoring service to monitor exactly how much data is consumed by the client, or exactly which parts of the files are consumed. For example, in a streaming service, each fragment could be a frame of a video, and notifying the monitoring service as to which fragments have been delivered would allow charging based on the sections of the video viewed (e.g. for pay-per-minute services), or allow evidence gained through lawful intercept to show exactly which portions of a video were viewed. This has the advantage that no guesswork needs to be made as to whether data has been delivered to a particular client device or not, even if it is delivered by a cache: the central monitoring service has complete knowledge of what data is or is not delivered.

Figure 1:
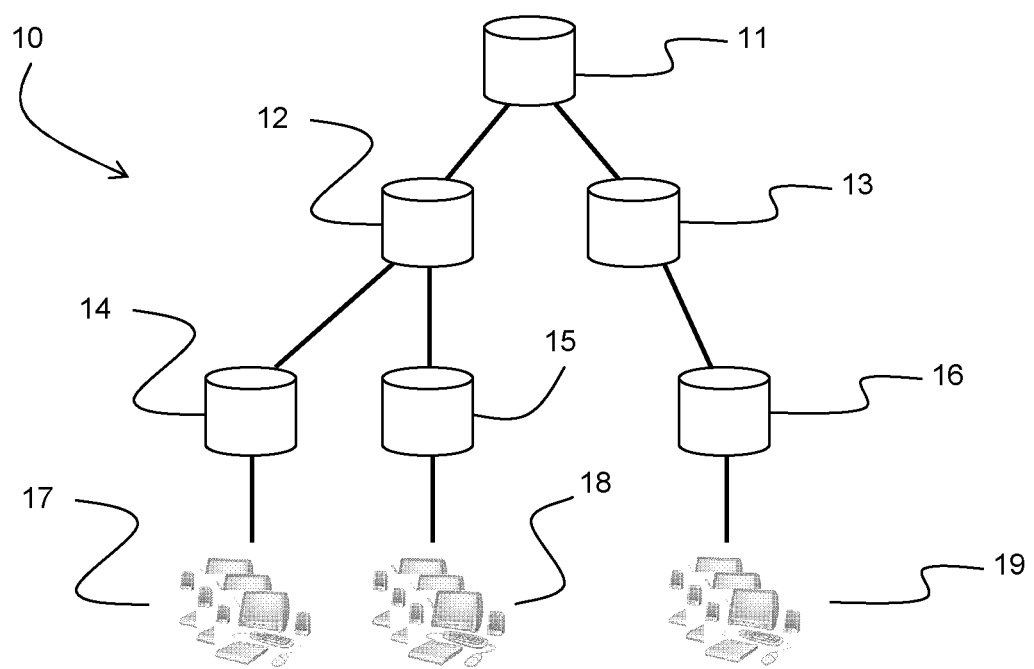
FIG. 1 is a schematic illustration of a network architecture.
Figure 2:
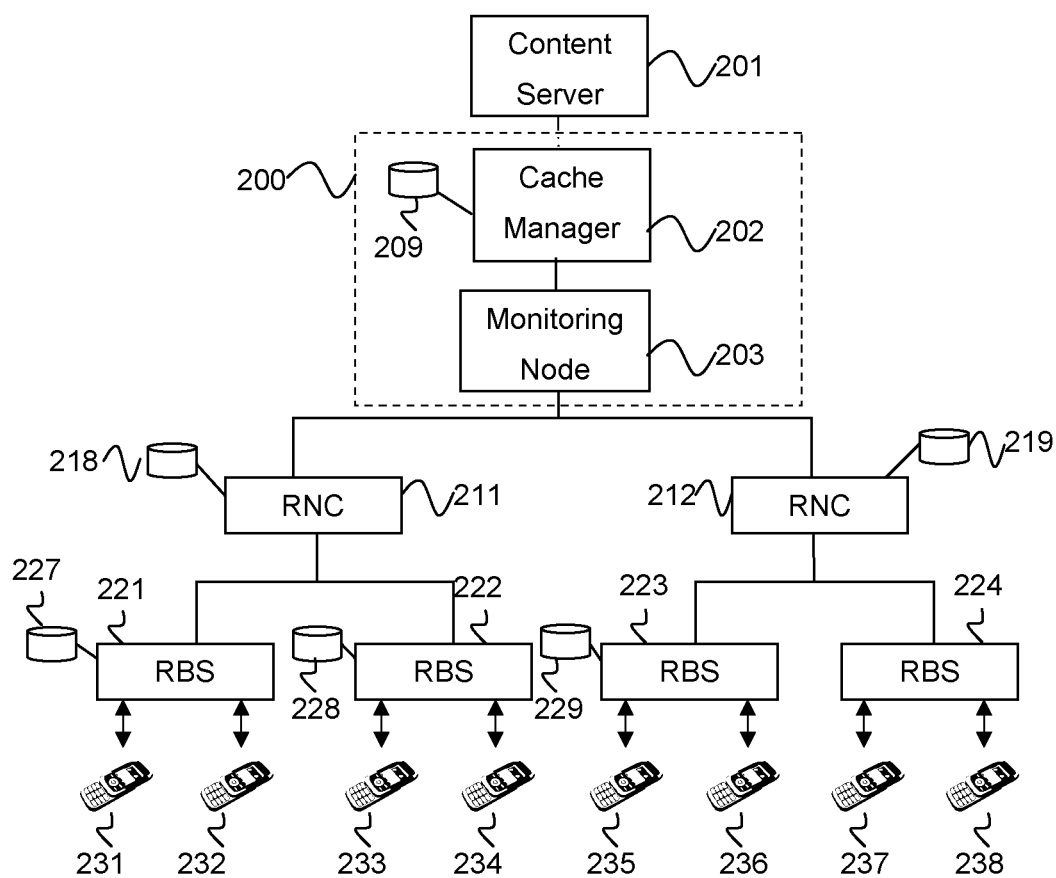
FIG. 2 is a schematic illustration of a radio access network.
Figure 3:
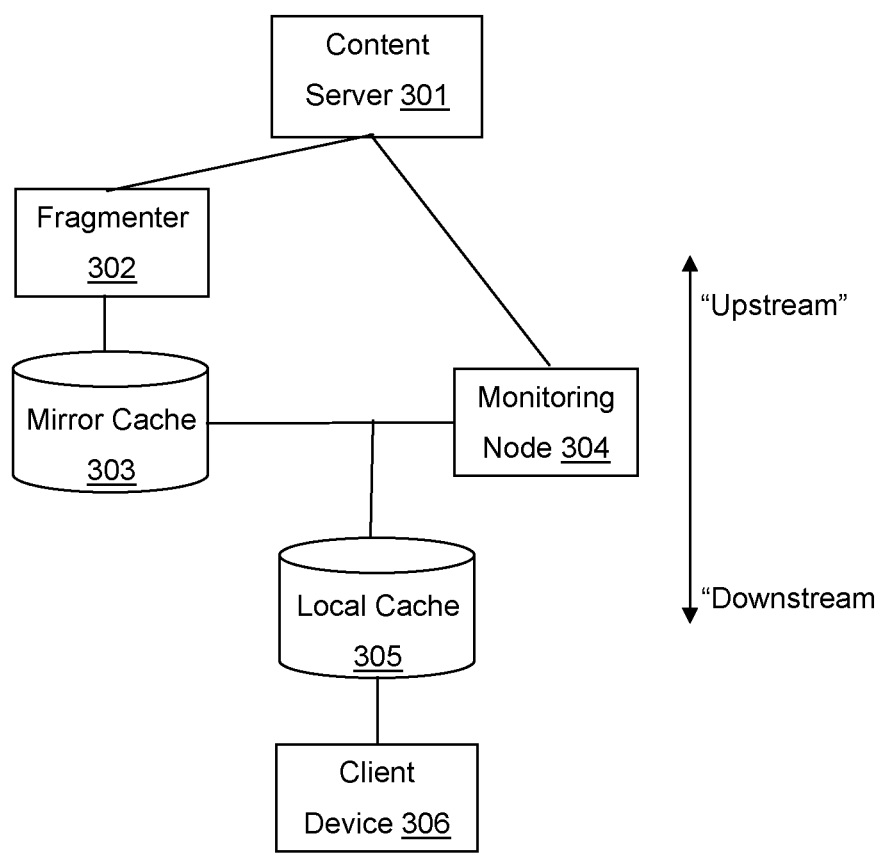
FIG. 3 is a schematic illustration of a network suitable to perform embodiments of the present invention.

Embodiments will now be described with reference to the accompanying Figures. FIG. 3 shows an example network. The network contains a content server 301, a fragmenter 302, a mirror cache 303, a monitoring node 304, a local cache 305 and a client device 306. Some of the nodes may be combined, for example the local cache 305 may be incorporated into or associated with the client device 306, the fragmenter 302 may be integrated with the mirror cache 303 or the content server 301, and/or the mirror cache may be integrated with the monitoring node 304. Where two nodes are combined, any action of sending data from a first node to a second node should be taken as passing the data from functions performed by the first node to functions performed by the second node.

The client device 306 may be, for a mobile telecommunications network, a user equipment (UE). Alternatively, it may be a personal computer, an automatic unit, or any device in a telecommunications network which consumes content distributed via the communications network.

The local cache 305 may be implemented in various network nodes. For example, it could be implemented in the client device. In a GSM network, it may be implemented in a radio base station, a base station controller, etc. In a WCDMA network, it may be implemented in a radio base station, a radio network controller, etc. In an LTE network, it may be implemented in an evolved node B, a security gateway, a serving gateway, etc. The local cache 305 should be closer (in a network sense) to the client device 306 than the mirror cache 303. Multiple local caches may be present in a network, to serve different content and/or different client devices.

The fragmenter 302 may be integrated with the mirror cache 303, or it may be integrated with the content server 301, and the fragments sent to the mirror cache. Alternatively, it may be a separate node, or implemented in another node of the network such as a cache manager.

The mirror cache may be implemented in a node of the core network.

Figure 4:
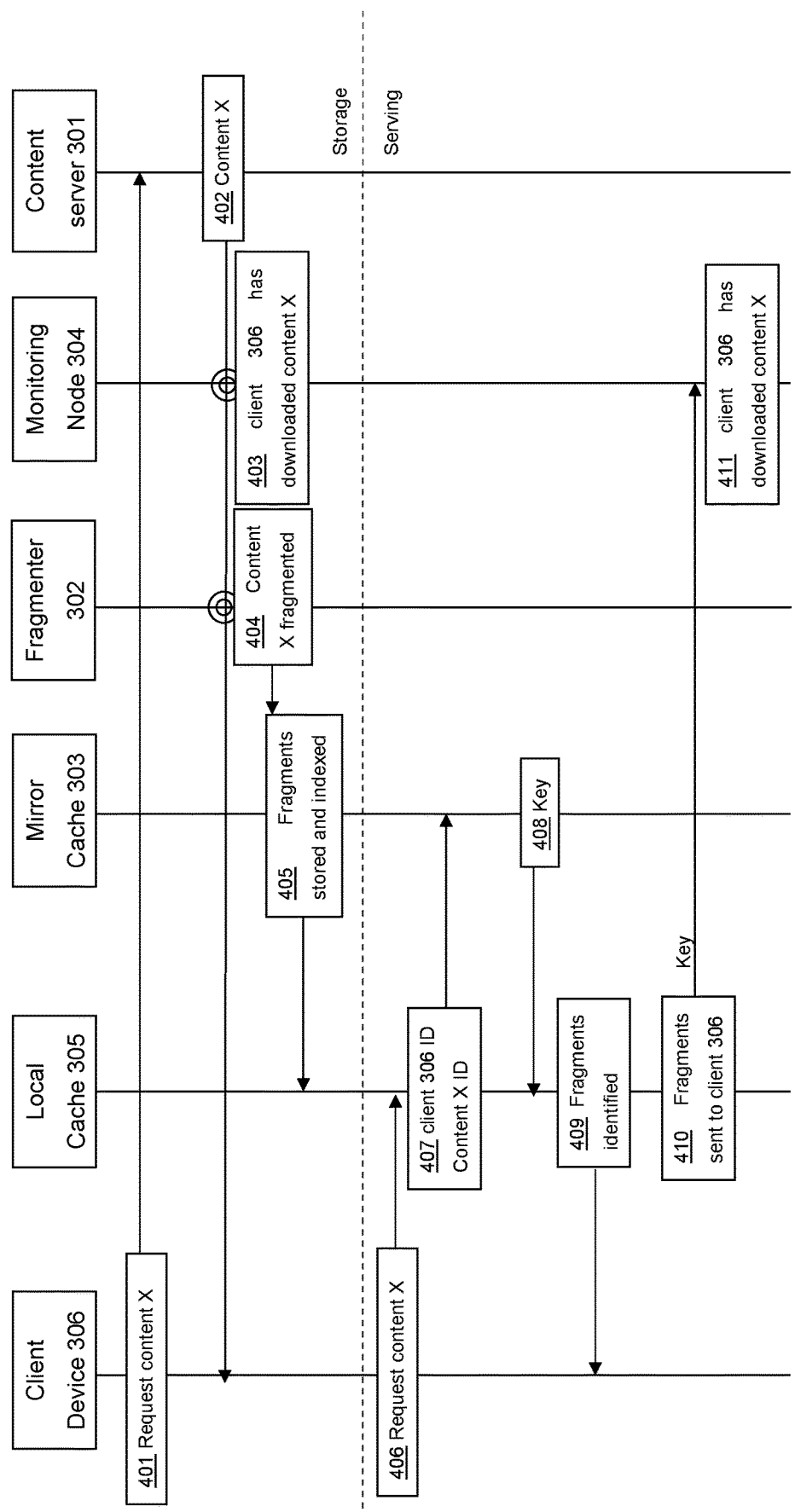
FIG. 4 shows the signaling associated with an embodiment of the present invention.

FIG. 4 shows the signaling in an exemplary embodiment.

Steps 401 to 405 show the stages of storing content in the caching system when it is first requested by the user of a client device.

401: The client device 306 requests content X from a content server 301.

This request may, for example, be an HTTP GET request.

402: The content server 301 sends the content X to the client device 306.

403: The monitoring node 304 on the network detects the content X, and records the access of the content by the client device 306.

404: The caching system detects the incoming content, and may decide to store a copy of it in the mirror cache 303. This may be performed by the mirror node, the node containing the fragmenter, or a separate cache manager node. The content is broken into fragments by the fragmenter 302, stored in the cache, and an index identifying the location of each fragment in the mirror cache is recorded in an index table 1102.

As shown in FIG. 11, the content 1101 is fragmented by a fragmenting function 1105, which references an index table 1102. The index table contains the indices of each fragment. If a fragment of the content matches a previously stored fragment, then the new fragment need not be stored, and the index for the previously stored fragment can be used. A mechanism may be used to search through the stored fragments for each new candidate to achieve this. This may reduce the storage needed for the mirror cache. If a fragment does not match a previously stored fragment, then the fragmenting function 1105 creates a new entry on the index table 1102 associating that fragment with a previously unused index.

405: The fragments are distributed to other caches in the network (e.g. the local cache 305)

The index for a fragment may be a pointer to the location in data storage in the mirror cache of the fragment, or may contain a pointer to the location in storage in the local cache 305 of the fragment.

Rather than storing content after it is requested by users, the cache may store predetermined content. For example, if the content server 301 is a video on demand service, the service may provide content to be cached in the network in order to reduce the load on their servers. In this case, the content is stored in fragments in the mirror and local caches as above.

The caching system can now serve the file to the client devices from the caches, rather than requiring the file to be sent from the content server. This is shown in the remaining steps.

406: A client device 306 requests content X.

407: The local cache 305 intercepts the content request, and sends a key request to the mirror cache 303, containing an identifier for the requested content, and an identifier for the client device 306. Alternatively, the content request may be intercepted by the mirror cache 303 itself.

408: The mirror cache 303 determines that content X is stored in the mirror cache 303, and that the local cache 305 contains the fragments of content X. The mirror cache 303 sends a key to the local cache 305 which contains the indices for the fragments of content X.

409: The local cache 305 uses the key to reassemble the content X, and sends content X towards the user.

If the local cache 305 is integrated in the client device 306, then sending the content towards the user may comprise sending the content to a user interface, or to a program such as a media player which processes the content. If the local cache 305 is separate to the client device 306, then sending the content towards the user will comprise sending the content to the client device 306.

410: The local cache 305 notifies the monitoring node 304 that the client device 306 has downloaded content X.

This notification may include an identifier for the content, or indices for the fragments of the content. It may also include sending an identifier for the content or indices of the fragments to a mirror cache 303, and the mirror cache 303 sending the content to the monitoring node 304.

411: The monitoring node 304 records that the client device 306 has downloaded content X.

This record may include an identifier for the content, the indices for the fragments, the time of the content request, and/or the content itself. The monitoring node may communicate with a mirror cache 303 to recover the content or information about the content (such as the size) using the identifier or indices.

This method ensures that the monitoring node 304 is notified about any access of the content by the client device. The method allows the monitoring node 304 to be located in the core network, whilst still keeping cached content in the RAN nodes. The method also allows monitoring of cache access even when the cache is located in the UE (for example, charging per view of movies, or allowing content to be "pre-loaded" during low traffic, and only charging when the content is accessed). Storing the content as fragments allows for data compression, as different content may include identical fragments, in which case the fragment only needs to be stored once.

In a simpler system, the local cache 305 may release the fragments without requiring the key from the mirror cache 303 (i.e. skipping steps 407 and 408). The mirror cache 303 is then used solely to ensure that the monitoring node 304 has access to a copy of the fragments.

It may be desirable for the monitoring node to record partial downloads, either for more accurate volume charging, or for tracking which portions of streaming content have been consumed. Tracking the exact portions of streaming content that have been consumed allows charging based on the length of the content consumed, e.g. a pay-per-minute video on demand service. For LI functions, it allows the LI system to store evidence as to which portions of the content were played on the client device.

Figure 5:
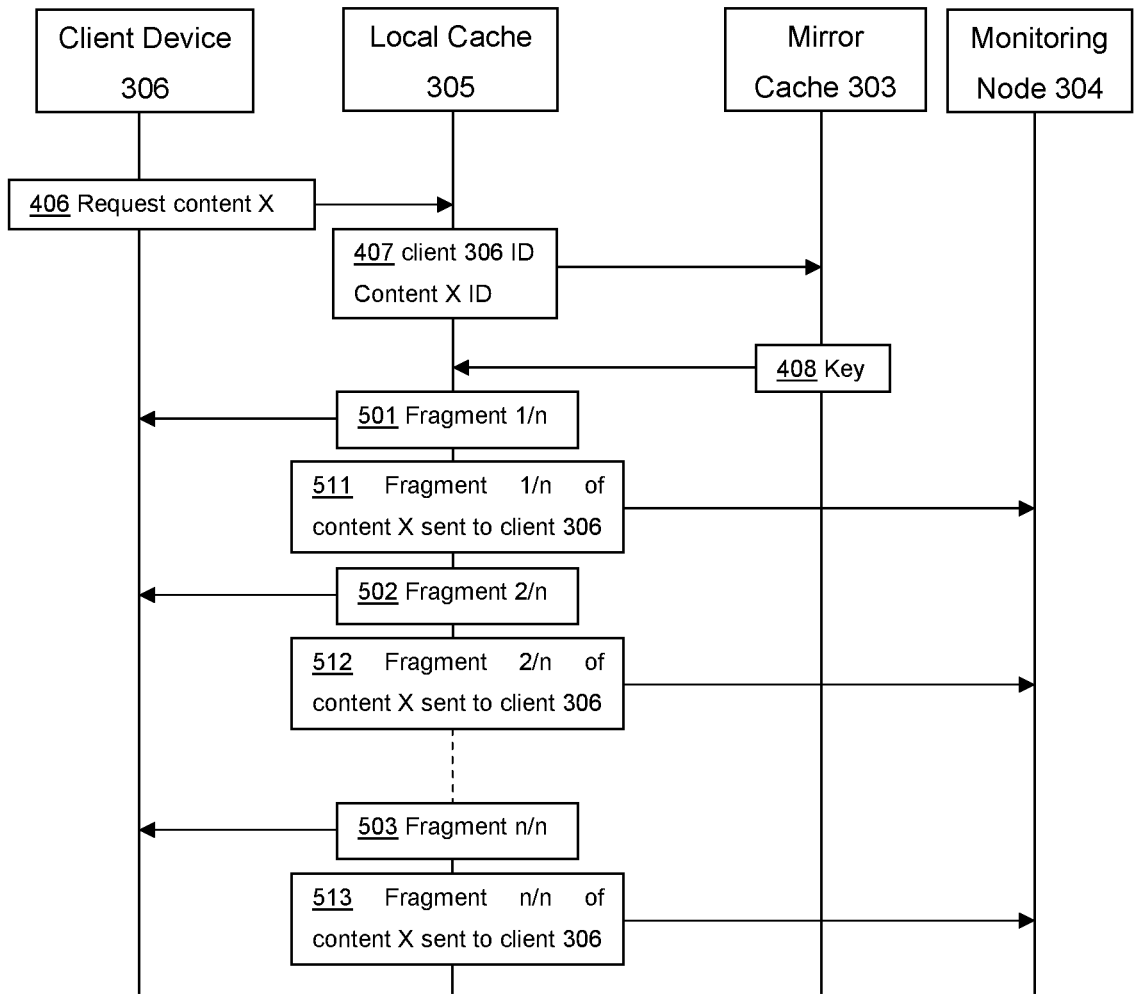
FIG. 5 shows the signaling associated with an optional feature of the embodiment.
Figure 6:
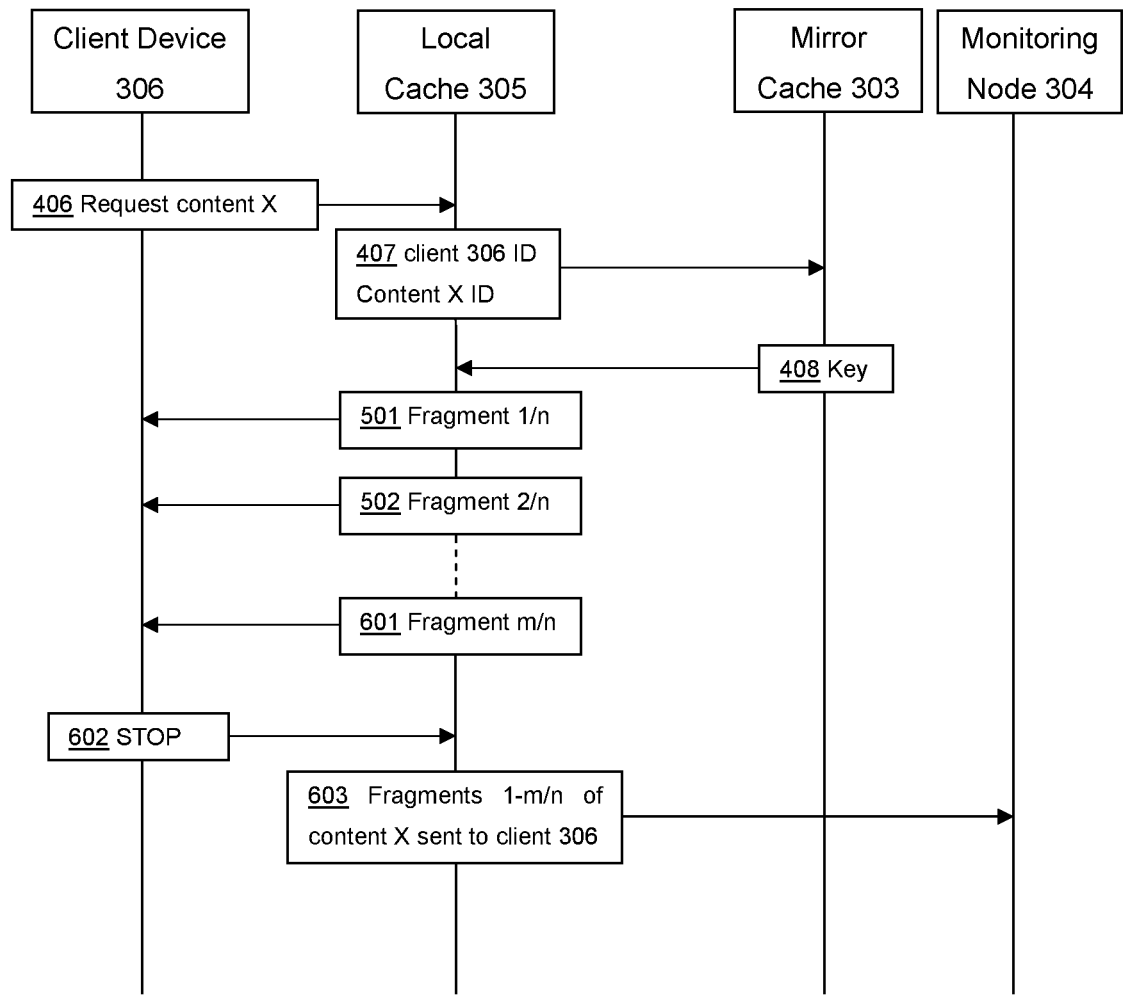
FIG. 6 shows the signaling associated with a further optional feature of the embodiment.

This is illustrated in FIGS. 5 and 6. The signaling when serving the content from the cache is identical to above for steps 406-408. FIG. 5 shows a simple method of tracking partial downloads. After each fragment is sent to the client device 306 (501 to 503), a message is sent from the local cache 305 to the monitoring node 304 notifying the monitoring node 304 that the fragment has been downloaded (511 to 513). In this way, in the case of a partial download, the monitoring node 304 will only receive notifications for the fragments that have been downloaded by the client device 306. This ensures that the monitoring node only records the parts of the content transmitted to the client device, allowing more accurate recording of the content consumed.

FIG. 6 shows an alternative method for tracking partial downloads. Each fragment is sent to the client device 306 (501, 502, 601), until the client device 306 sends a STOP command (602), or connection is lost, or some other trigger. The local cache 305 then notifies the monitoring node 304 which fragments had been downloaded by the client device before the download was stopped.

While the Figures show the download starting from the first fragment of the content, this may not be the case, for example when a user is watching a streaming video and starts somewhere other than at the beginning. In this case, the monitoring server can record the start and end points of the section of the video watched by the user.

For the methods above to function correctly, it is important that the mirror cache 303 and the local cache 305 contain the same fragments with the same indices. If there were to be a mismatch, then a malformed file may be delivered, and the monitoring service may get an incorrect picture of the file delivered to the client device 306. Synchronisation between the mirror cache 303 and the local cache 305 could be achieved by constantly updating the local caches whenever the mirror cache 303 is changed. This would result in a large amount of network traffic whenever the mirror cache 303 is changed. A preferable system would be to perform "passive" updates during low traffic periods, in which changes to the mirror cache 303 since the last update are sent to the local cache 305, and "active" updates when content is requested and there is a mismatch between the mirror cache 303 and the local cache 305.

Figure 7:
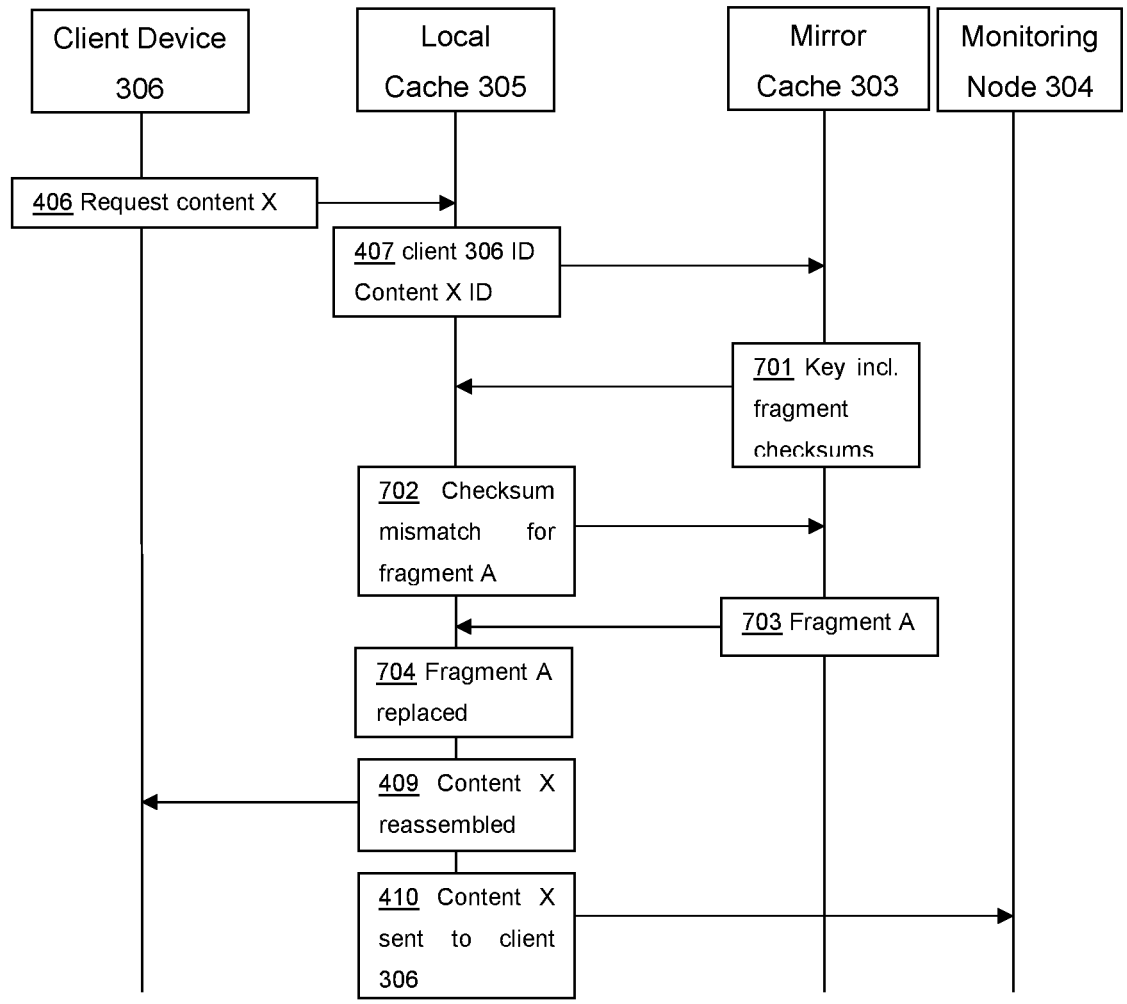
FIG. 7 shows the signaling associated with an optional method of updating the local cache.

A method of performing these active updates is shown in FIG. 7. The method proceeds as before for steps 406 and 407.

701: The mirror cache 303 sends a key and a checksum of each of the fragments of content X to the local cache 305.

702: The local cache 305 compares the checksums received from the cache manager with the checksums of the fragments at the indices specified in the key. If they match, the cache serves the content to the client device 306 as normal. If they do not match, or there is no fragment for an index, the local cache 305 notifies the mirror cache 303, specifying the indices.

703: The mirror cache 303 sends updated fragments for the indices to the local cache 305. The local cache 305 stores these fragments in place of the fragments for which the checksums did not match.

The local cache 305 then serves the content to the client device 306 by one of the preceding methods (e.g. 409, 410), using the updated fragments.

This ensures that only the changed fragments are transferred from the mirror cache 303 to the local cache 305, and only when they are needed, lowering the extra traffic on the network during busy periods. The mirror cache 303 can keep a log of active updates that have been performed to avoid sending already updated fragments during passive updating.

The following optional elements may apply to any of the above methods.

Local caches may only store part of the contents of the mirror cache. In this case, the key sent to the local cache 305 serving the client device will include an identifier for local caches which contain each fragment. The local cache 305 serving the client device will then request each fragment from the closest (in a network sense) cache which contains that fragment.

The mirror cache 303 may be outside the core network, for example, in a video-on-demand service, the mirror cache 303 may be at the content provider, and be linked to local caches in the RAN. The present solution may be implemented by maintaining a copy of the mirror cache 303 at the monitoring node 304, and monitoring and recording the key requests sent to the mirror cache 303, and/or the keys sent from the mirror cache 303 to the client devices 306. The cache at the monitoring node 304 can be updated by monitoring the data transmitted from the mirror cache 303 to the local caches 305, and incorporating any updates sent to the local caches 305 into the cache at the monitoring node 304.

Each fragment may be encrypted in the local cache 305, and the key sent from the mirror cache 303 may include the encryption key used to encrypt the fragments. Encryption further ensures that the content cannot be accessed without the knowledge of the mirror cache 303, even in the case where a file consists of a single fragment.

The mirror cache may release the key only once it has received authorisation from the monitoring node. Alternatively, the local cache may not release the fragments until it has received such authorisation. This may be used, for example, to deny service to clients based on excessive use.

Figure 8:
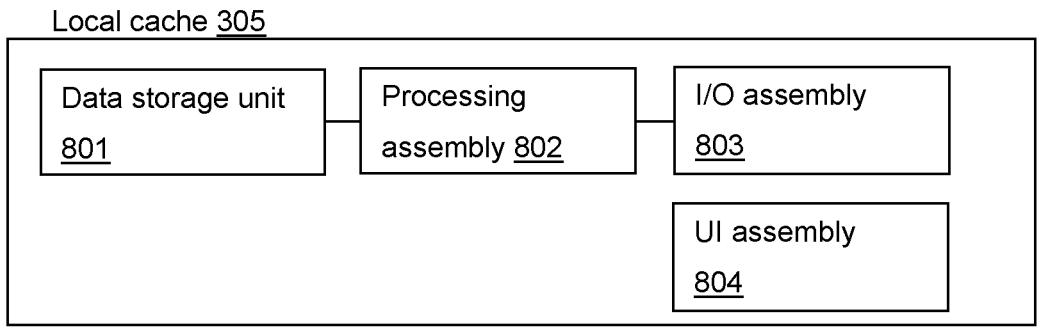
FIG. 8 shows a schematic representation of an apparatus suitable for use as a local cache 305.

FIG. 8 shows a schematic representation of an apparatus suitable for use as a local cache 305. The apparatus comprises a data storage unit 801 for storing fragments of content, an input/output (I/O) assembly 803 for communicating with the mirror cache 303, the client device 306, and the monitoring node 304, and a processing assembly 802 for identifying fragments associated with content requested by the client device 306. If the local cache is integrated with the client device 306, then it will comprise a user interface (UI) assembly 804.

The local cache 305 may be implemented in or co-located with another network node. In a GSM network, it may be implemented in or associated with a radio base station, a base station controller, etc. In a WCDMA network, it may be implemented in or associated with a radio base station, a radio network controller, etc. In an LTE network, it may be implemented in an evolved node B, a security gateway, a serving gateway, etc. The local cache 305 should be closer (in a network sense) to the client device 306 than the mirror cache 303. Multiple local caches may be present in a network, to serve different content and/or different client devices.

Figure 9:
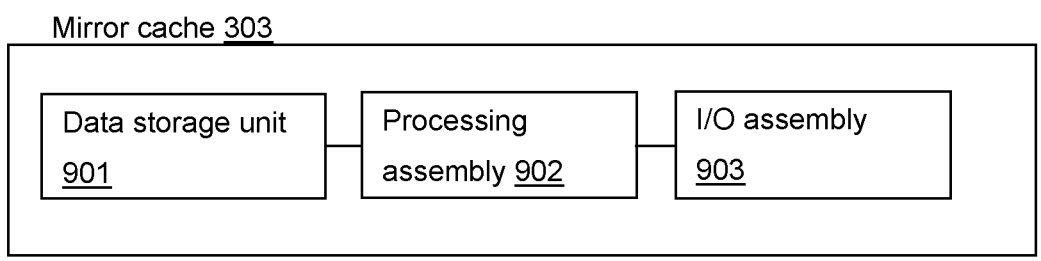
FIG. 9 shows a schematic representation of an apparatus suitable for use as a mirror cache 303.

FIG. 9 shows a schematic representation of an apparatus suitable for use as a mirror cache 303. The apparatus comprises a data storage unit 901 for storing fragments of content, indices of the fragments, and a database associating the indices with content. The apparatus further comprises an I/O assembly 903 for communicating with the local cache 305, monitoring node 304, and fragmenter 302. The apparatus may comprise a processing assembly 902 for calculating checksums of the fragments and for searching the data storage unit for existing fragments before storing new fragments.

The mirror cache may be implemented in or co-located with a node of the core network.

Figure 10:
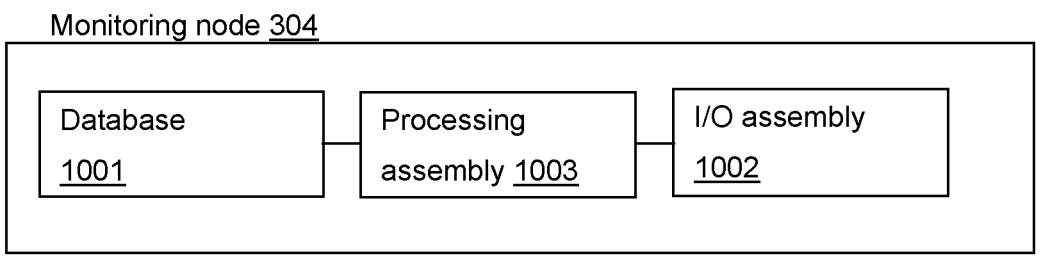
FIG. 10 shows a schematic representation of an apparatus suitable for use as a monitoring node 304.

FIG. 10 shows a schematic representation of an apparatus suitable for use as a monitoring node 304. The apparatus comprises a database 1001 of client devices 306 and the content consumed by the client devices 306, and an I/O assembly 1002 for communicating with a mirror cache 303 and a local cache 305. The apparatus may comprise a processing assembly 1003 for determining if a client device 306 is authorised to access requested content.

Where the term "I/O assembly" is used with reference to the above apparatuses, this should be taken to include components that allow communication between different functions (e.g. logic units) on a device in the case where nodes of the network as illustrated in FIG. 3 are combined.

The above apparatuses are configured to execute steps of the methods described above. Alternatively, they may store instructions (e.g. computer code), which when executed cause the apparatus to perform those steps. These instructions may be stored on memory, which may be part of the apparatus, or a separate computer program product comprising a computer readable medium on which the instructions are stored. The memory may be read only memory (ROM) or random access memory (RAM). The instructions to configure the apparatuses described above may be encoded as hardware or as software.

Figure 12:
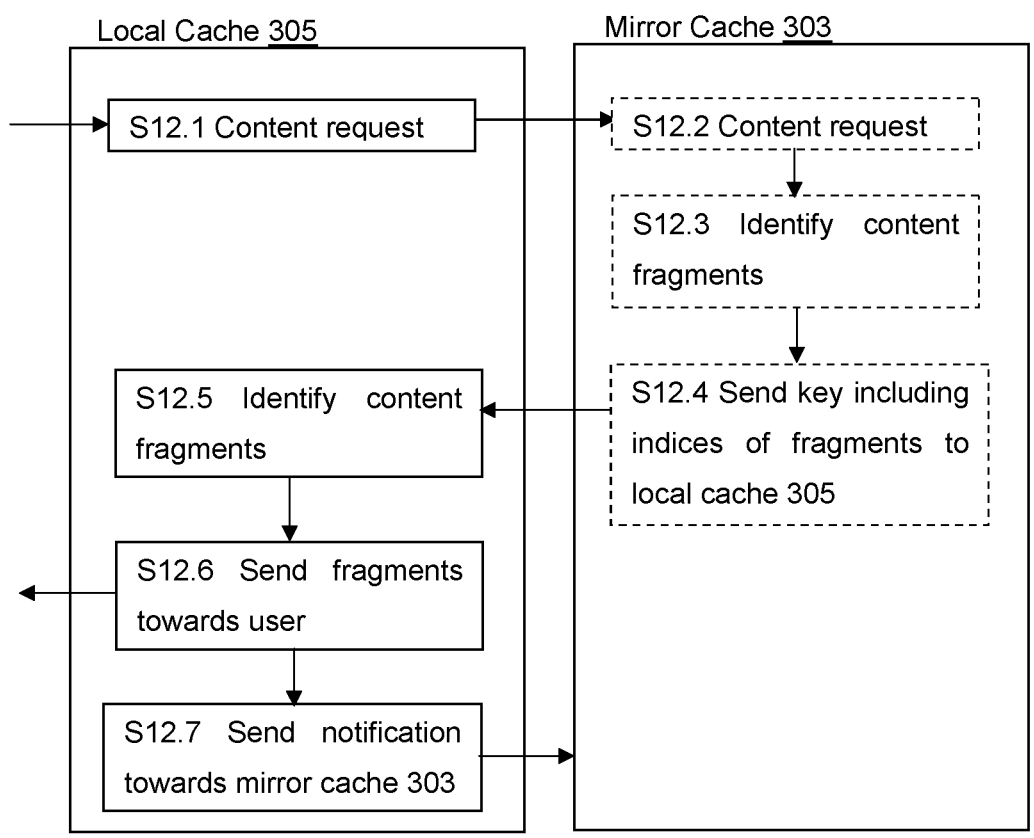
FIG. 12 is a flowchart for a method of serving content from a caching system.

FIG. 12 is a flowchart showing a method of serving content from the caching system. The local cache 305 receives a content request (S12.1). The local cache 305 then identifies fragments of the content stored in the local cache (S12.5) and sends these fragments towards the user (S12.6). The local cache 305 then sends a notification towards the mirror cache 303 indicating the content requested and/or the fragments sent towards the user (S12.7).

The local cache 305 may use a key sent from the mirror cache 303 to identify the fragments (as shown in FIG. 4, steps 406 to 411). The mirror cache 303 receives a content request, either directly from the user or from the local cache 305 (S12.2). The mirror cache 303 identifies fragments of the content stored at the mirror cache 303 (S12.3). The mirror cache 303 generates a key comprising the indices of these fragments and sends the key to the local cache 303 (S12.4).

Figure 13:
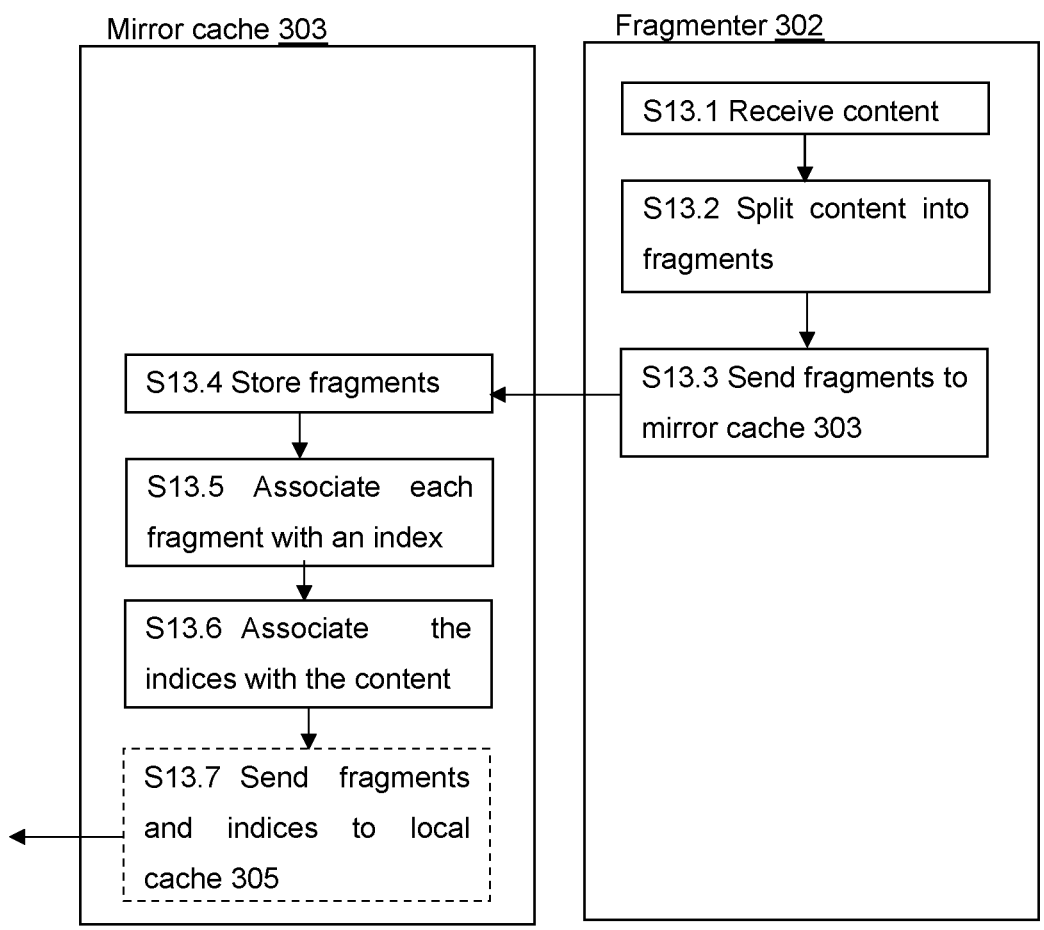
FIG. 13 is a flowchart for a method of storing content in a caching system.

FIG. 13 is a flowchart showing a method of storing content in the caching system. This expands on steps 404 and 405 in FIG. 4. A fragmenter 302 receives content to be stored (S13.1). The fragmenter 302 splits the content into fragments (S13.2). These fragments may, for example, be of predetermined size, or may be certain parts of the content (e.g. frames of video content) The fragmenter then sends the content to the mirror cache 303 (S13.3). The mirror cache 303 stores the fragments (S13.4), associates each fragment with an index (S13.5) and associates the indices with the content in a content database (S13.6). A search is made of fragments already stored and, if a fragment received from the fragmenter 302 matches a fragment already stored and indexed at the mirror cache 303, then the mirror cache may not store the new fragment, and may instead associate the index of the already stored fragment with the content. The fragments and indices may then be sent to local caches 305 (S13.7), for example in accordance with the passive and active updating methods described above.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. An apparatus configured to operate as a local cache in a telecommunications network, the telecommunications network having a distributed caching system including an upstream mirror cache and one or more downstream local cache(s), the apparatus comprising:
    a data storage unit, the data storage unit configured to store fragments of content data, each fragment being associated with an index;
    an input/output (I/O) assembly, the I/O assembly configured to receive a request for content from a user;
    a processing circuit, the processing circuit configured to identify fragments associated with the requested content;
    wherein the I/O assembly is further configured to:
        send the identified fragments towards the user;
        send an identifier for the user, and any of an identifier for the requested content and an index of the or each identified fragment, towards a mirror cache upstream of the local cache.

2. The apparatus of claim 1, wherein the I/O assembly is configured to send the index for each fragment to the mirror cache in response to the fragment being sent towards the user.

3. The apparatus of claim 1, wherein:
    the I/O assembly is configured to receive a key from the mirror cache, the key comprising the indices identifying the requested content; and
    the processing circuit is configured to identify the or each fragment using the indices.

4. The apparatus of claim 3, wherein:
    the key comprises checksums for the or each index;
    the processing circuit is configured to compare the checksum in the key for the or each index with the checksum of the fragment associated with the or each index in the data storage;
    the I/O assembly is configured to send a request to the mirror cache identifying an index for which a mismatch occurred, and to receive an update fragment from the mirror cache;
    the data storage unit is configured to replace the fragment associated with the index for which the mismatch occurred with the update fragment.

5. The apparatus of claim 3, wherein the key comprises a secret and the processing circuit is configured to decrypt each fragment using the secret.

6. The apparatus of claim 1, wherein the apparatus is any one of: a radio base station, a Universal Mobile Telecommunications System (UMTS) node B, a mobile station, and a radio network controller.

7. The apparatus of claim 1, wherein
the apparatus comprises a user interface assembly;
the I/O assembly is configured to send the identified fragments to the user by sending the fragments towards the user interface assembly.

8. The apparatus of claim 1, wherein the I/O assembly is configured to send the identified fragments to the user by sending the fragments towards a client device downstream of the apparatus.

9. An apparatus configured to operate as a mirror cache in a telecommunications network, the telecommunications network having a distributed caching system including an upstream mirror cache and one or more downstream local cache(s), the apparatus comprising:
a data storage unit, the data storage unit configured to store fragments of content data, an index associated with each fragment, and a database for storing a list of content data and associated indices;
an input/output (I/O) assembly, the I/O assembly configured to receive a request for content;
a processing circuit, the processing circuit configured to:
identify indices associated with the requested content; and
generate a key comprising the identified indices; and
wherein the I/O assembly is further configured to send the key to a local cache.

10. The apparatus of claim 9, wherein:
at least one of:
the processing circuit is configured to calculate a checksum for a fragment;
the data storage unit is configured to store a checksum for each fragment;
the processing circuit is configured to include the checksum for the fragment associated with each identified index in the key;
the I/O assembly is configured to receive an index for an update fragment from a client device, and in response thereto send the update fragment to the client device.

11. The apparatus of claim 9, wherein the I/O assembly is configured to send the key only in response to receiving authorization from a monitoring node.

12. An apparatus configured to operate as a mirror cache in a telecommunications network, the telecommunications network having a distributed caching system including an upstream mirror cache and one or more downstream local cache(s), the apparatus comprising:
a data storage unit, the data storage unit configured to store fragments of content data, and an index associated with each fragment;
an input/output (I/O) assembly, the I/O assembly configured to:
receive, from a client device, an index or indices for one or more fragments and an identifier for a client device; and
identify, to a monitoring node, the content data identified by the received index or indices and the identifier for the client device.

13. An apparatus configured to act as a monitoring node in a telecommunications network, the telecommunications network having a distributed caching system including an upstream mirror cache and one or more downstream local cache(s), the apparatus comprising:
an input/output (I/O) assembly, the I/O assembly configured to receive an identifier for a client device, and indices for fragments sent to the client device;
a database, the database configured to store a list of client devices and the indices of fragments sent to the client devices.

14. The apparatus of claim 13:
wherein the I/O assembly is configured to receive a request for content, the request including an identifier for the requesting device;
further comprising a processing circuit, the processing circuit configured to determine if the requesting device is authorized to access the content;
wherein the I/O assembly is configured to send an authorization message to a mirror cache in response to the processing circuit determining that the requesting device is authorized to access the content.

15. The apparatus of claim 13, wherein the apparatus is a service aware charge and control (SACC) node or a lawful intercept (LI) node.

16. A method of providing cached content in a telecommunications network, the telecommunications network having a distributed caching system including an upstream mirror cache and one or more downstream local cache(s), the method comprising:
requesting content from a caching system;
at a local cache:
identifying fragments associated with the requested content;
sending the identified fragments towards a user;
sending an identifier for the user, and any of an identifier for the requested content and an index of each identified fragment, towards a mirror cache upstream of the local cache.

17. The method of claim 16:
wherein the mirror cache communicates with or is integrated in a monitoring node;
further comprising recording, at the monitoring node, that a client has consumed the requested content and/or the identified fragments.

18. The method of claim 17, further comprising the monitoring node recording the index of each identified fragment.

19. The method of claim 16, wherein the local cache sending the index for each fragment towards the mirror cache is in response to the fragment being sent towards the user.

20. The method of 16, wherein the local cache sending the index of each identified fragment towards the mirror caches comprises the local cache sending the index for each fragment sent towards the user when the user finishes accessing fragments.

21. The method of claim 16, wherein the index for each fragment is a pointer to the location of that fragment in a data storage unit of the mirror cache and/or local cache.

22. The method of claim 16:
further comprising, prior to the local cache identifying the fragments associated with the requested content:
the mirror cache identifying fragments associated with the requested content;
the mirror cache sending a key comprising the index of each fragment to the local cache;
further comprising identifying the fragments at the local cache using the key.

23. The method of claim 22, wherein the key comprises a checksum for each fragment, the method further comprising, prior to making the or each fragment available to the client device:
at the local cache:
detecting a mismatch between the checksum in the key for the or each fragment and the checksum of the fragment associated with the index in the local cache;
sending a request to the mirror cache identifying an index for which the mismatch occurred;
at the mirror cache, sending the fragment in the mirror cache associated with the index for which the mismatch occurred to the local cache;
at the local cache, receiving an update fragment from the mirror cache, and replacing the fragment associated with the index in the local cache for which the mismatch occurred with the update fragment.

24. The method of claim 22:
wherein each fragment is encrypted;
wherein the key comprises a secret
further comprising the local cache decrypting the fragments using the secret.

25. The method of claim 22, further comprising, the mirror cache receiving, from a monitoring node and prior to sending the key to the local cache, an authorization message indicating that the user is authorized to access the requested content.

26. The method of claim 16:
wherein the local cache is located at a client device;
wherein the sending the identified fragments towards the user includes sending the identified fragments towards a user interface assembly of the client device.

27. The method of claim 16:
wherein the local cache is located upstream of a client device;
wherein the sending the identified fragments towards the user includes sending the identified fragments towards the client device.

28. The method of claim 27, wherein the requesting content from the caching systems comprises the client device requesting content from the caching system by sending an HTTP GET request.

29. The method of claim 16, wherein the content is video content and each of the fragments is a frame of the video content.

30. The method of claim 29, further comprising a monitoring node determining a portion of the video content corresponding to the fragments sent towards the user.

31. A method of storing content in a cache in a network, the telecommunications network having a distributed caching system including an upstream mirror cache and one or more downstream local cache(s), the method comprising:
in a mirror cache:
receiving, from a fragmenter, content split into fragments;
storing the fragments;
associating each fragment with an index;
associating the indices with the content.

32. The method of claim 31, wherein the content is video content and each of the fragments is a frame of the video content.

33. The method of claim 31, further comprising the mirror cache:
identifying a first fragment of the content which is identical to a second fragment stored in the mirror cache;
deleting the first fragment and the index associated with the first fragment;
associating an index associated with the second fragment with the content.

34. The method of claim 31, wherein the index for each fragment comprises a pointer to the location of that fragment in data storage of the mirror cache.

35. The method of claim 31, further comprising the mirror cache sending the fragments and the indices towards a local cache.

36. The method of claim 31, wherein the mirror cache also acts as the fragmenter.

37. A computer program product stored in a non-transitory computer readable medium for providing cached content in a telecommunications network, the telecommunications network having a distributed caching system including an upstream mirror cache and one or more downstream local cache(s), the computer program product comprising software instructions which, when run on one or more processing circuits, causes the one or more processing circuits to:
request content from a caching system;
cause a local cache to:
identify fragments associated with the requested content;
send the identified fragments towards a user;
send an identifier for the user, and any of an identifier for the requested content and an index of each identified fragment, towards a mirror cache upstream of the local cache.

38. A computer program product stored in a non-transitory computer readable medium for storing content in a cache in a network, the telecommunications network having a distributed caching system including an upstream mirror cache and one or more downstream local cache(s), the computer program product comprising software instructions which, when run on one or more processing circuits of a mirror cache, causes the mirror cache to:
receive, from a fragmenter, content split into fragments;
store the fragments;
associate each fragment with an index;
associate the indices with the content.

* * * * *